United States Patent [19]

Fock et al.

[11] Patent Number: 5,541,261
[45] Date of Patent: Jul. 30, 1996

[54] POLYMETHACRYLATE-POLYMETHACRYLIC ACID BLOCK COPOLYMERS

[75] Inventors: Jürgen Fock, Düsseldorf; Arno Knebelkamp, Essen, both of Germany

[73] Assignee: Th. Goldschmidt AG, Essen, Germany

[21] Appl. No.: 379,222

[22] Filed: Jan. 27, 1995

[30]   Foreign Application Priority Data

Jan. 28, 1994 [DE] Germany .................. 44 02 484.3

[51] Int. Cl.$^6$ .................. C08F 8/12; C08F 20/10
[52] U.S. Cl. ............................ 525/299; 525/301
[58] Field of Search .................... 525/299, 301

[56]        References Cited

U.S. PATENT DOCUMENTS 4,508,880  4/1985  Webster ........................ 526/190

FOREIGN PATENT DOCUMENTS 0518225  6/1992  European Pat. Off. .
2123766  12/1971  Germany .

OTHER PUBLICATIONS

Berein et al, Stabilization of Acrylic Polymers, Vysokomol. Soedin, Ser. B, 14(10) 1972, pp. 736–740. (Russian).
S. P. Rannard, et al., Synthesis of Monodisperse Block . . . , May 29, 1992, vol. 29, No. 2/3, pp. 407–414, School of Chemistry and Molecular Sciences.
Sunil K. Varshney, et. al., Anionic Polymerization . . . , pp. 4997–5000,
Chemical Abstracts vol. 98, 54652f (1983), Study of the inieraction . . .

Primary Examiner—Irna Zemel
Attorney, Agent, or Firm—Anderson Kill Olick & Oshinsky, P.C.

[57]           ABSTRACT

Inventive block copolymers are prepared, and their synthesis is described. These inventive block copolymers act as polymeric surfactants, especially as emulsifiers and surfactants, and as compounds having antistatic properties.

2 Claims, No Drawings

POLYMETHACRYLATE-POLYMETHACRYLIC ACID BLOCK COPOLYMERS

FIELD OF THE INVENTION

The invention relates to new polymethacrylate-polymethacrylic acid block copolymers and their alkali or ammonium salts. The invention further relates to the synthesis of these new block copolymers and to polymeric surfactants, particularly as dispersants and emulsifiers, as well as materials for modifying the antistatic properties comprising the new block copolymers.

Furthermore, the invention relates to polymethacrylate/poly-t-butyl methacrylate block copolymers as new intermediates for the synthesis of the inventive polymers.

BACKGROUND INFORMATION AND PRIOR ART

The *German Offenlegungsschrift* 21 23 766 relates to copolymers with a hydrophilic surface. They are composed of 75 to 92% methyl methacrylate and 8 to 25% of acrylic acid. The polymerization takes place by a free radical mechanism in the absence of any solvent, so that polymers with a statistical distribution of the monomer units are obtained. The copolymers admittedly are referred to as block copolymers. However, this is a solventless copolymerization of the mixture of monomers and not the blockwise arrangement of the monomer units. The copolymers are recommended particularly for the production of contact lenses, since the surfaces of the shaped copolymers are superficially hydrophilized by reaction with bases.

Polymethyl methacrylate/poly-t-butyl(meth)acrylate block copolymers and their synthesis by anionic polymerization are described in *Macromolecules*, (1991), 24, 4997–5000. However, this method can hardly be carried out on an industrial scale, since the anionic polymerization requires very pure, anhydrous solvents (particularly tetrahydrofuran) and reactants. The reaction must be carried out at low temperatures of about –78° C. Moreover, it is necessary to use alkali metal initiators.

The EP publication 0 518 225 discloses aqueous, pigmented inks for ink jet printers. These inks contain an AB or ABA block copolymer as stabilizer, the A segment of which is synthesized, for example, by polymerizing n-butyl methacrylate and the B segment initially by polymerizing trimethylsilyl methacrylate. From the latter, a polymethacrylic acid segment can be produced by splitting off the trimethyl group hydrolytically. For the polymerization, the group transfer polymerization (GTP method) described, for example, in U.S. Pat. No. 4,508,880, is employed.

A detailed description of this GTP may be found in *Eur. Polym. J.* Vol. 29, No. 2/3, 407–414 (1993). Typically, the polymerization is initiated by a O-silyl ketene acetate; 1-methoxy-1-(trimethylsiloxy)-2-methylpropene is customary. A nucleophilic compound, such as tris(dimethylamino)sulfonium bifluoride is used as a catalyst. The GTP method proceeds as follows:

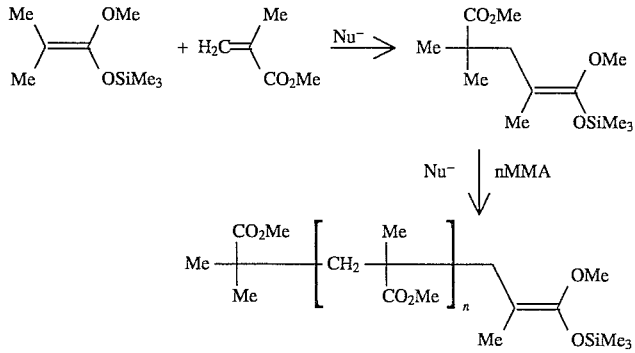

As with the anionic polymerization, this method also requires that the reactants used should be dried very carefully and be free from residues of alcohol. Furthermore, even traces of moisture must be kept from the reaction. Moreover, the compounds used as initiator and as catalyst are expensive, so that this method, as a whole, is costly when used industrially.

The present invention is concerned with the technical problem of synthesizing block copolymers, the segments of which are formed from methacrylate esters and methacrylic acid or its salts. The desired block copolymers are to be synthesized in the simplest way possible, in order to enable these compounds to be made on an industrial scale.

Admittedly, the reaction of polymethacrylate esters with a large excess of diethylaminoethanol at temperatures in excess of 150° C. in the presence of titanates as catalysts is known from *Chemical Abstracts* 98 (No. 8, 54652f). Polymers are obtained here, for which a portion of the ester groups is transesterified with diethylaminoethanol. However, relatively impure products are obtained at this temperature since it is impossible to avoid obtaining the thermal decomposition products.

Surprisingly, however, it was found that by adhering to certain structural parameters for the polymethacrylate esters that are to be reacted, and by selecting suitable process conditions for the transesterification, it is possible to transesterify one or both terminal ester groups, the terminal tertiary ester group being decisively preferred over the quaternary ester group. This enables the synthesis of novel polymethacrylate esters, the ester groups of which in the α and optionally in the ω positions, differ from those ester groups in the chain.

OBJECT OF THE INVENTION

An object of the present invention is the inventive block copolymers. Another object of the invention is a method of synthesizing the inventive block copolymers. Yet another object of the invention is a polymeric surfactant or a compound having antistatic properties comprising the inventive block copolymers.

New block copolymers have the general formula

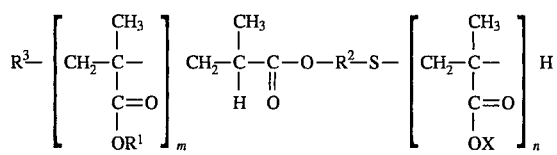

wherein $R^1$ are the same or different and represent alkyl groups, except the t-butyl group, with 1 to 22 carbon atoms perfluoroalkyl groups or dialkyl-aminoalkyl groups, $R^2$ are $-(CH_2)_p$ groups, in which p is a number from 2 to 6, $R^3$ represents the group of a known chain length regulator, which is free of active hydrogen atoms, X is a cation, and n and m are the same or different and in each case have an average numerical value of not less than 3.

Within the polymeric molecule, $R^1$ can be the same or different. Preferably, $R^1$ is an alkyl group with 1 to 8 carbon atoms, particularly the methyl, ethyl, butyl or 2-ethylhexyl group. $R^1$ shall not be the t-butyl group.

$R^2$ is a divalent aliphatic group having the formula $-(CH_2)_p-$, wherein p is a number from 2 to 6, preferably a numerical value of 2 or 3 and particularly is 2.

$R^3$ is the group of a known chain-length regulator, the $R^3$ group being free of active hydrogen atoms. Examples of chain length-regulators are mercaptans, chloroform and isopropylbenzene. A preferred example of an $R^3$ group originating from such a chain-length regulator is the $-C_{12}H_{25}S$ group. Further examples of groups originating from chain-length regulators are the groups derived from t-dodecyl mercaptan and the octadecyl mercaptan and tetradecyl mercaptan groups.

X is a cation, preferably a hydrogen, alkali or ammonium group, which optionally can be alkyl-substituted. Examples of such substituted ammonium groups are the $NH(CH_3)_3-$, $N(C_2H_5)_4-$ and $NH(CH_2-C_6H_5)(CH_3)_2-$ groups. Moreover, the cations, known from the state of the art for poly-methacrylic acid polymers, can also be selected. They are described in detail, for example, in the EP publication 0 518 225 (page 5).

Subscripts n and m are identical or different and have, in each case, an average numerical value of not less than 3. In each case, numerical values of 4 to 20 are particularly preferred for n and m.

Examples of inventive block copolymers are:

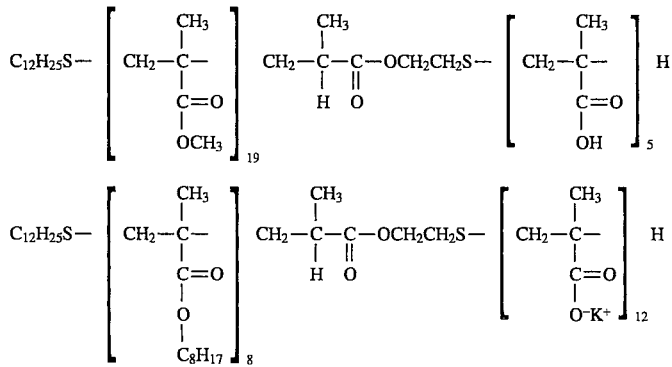

$R^1$ can also be a perfluoroalkyl group. Examples of perfluoroalkyl groups are the $-CH_2CF_3$, $-(CH_2)_2C_8F_{17}$ or $-CH_2-CHF-CHF_2$ groups.

$R^1$ can furthermore represent a dialkylaminoalkyl group. Examples of suitable dialkylaminoalkyl groups are groups having the formula $-R^6-NR^7R^8$, wherein $R^6$ is an alkyl group with 1 to 4 carbon atoms and $R^7$ and $R^8$ are the same or different and represent alkyl groups with 1 to 4 carbon atoms. Examples of such groups are the $-CH_2-CH_2-N(CH_3)_2$ and the $-CH_2-CH(CH_3)-N(C_2H_5)_2$ groups.

Yet another object of invention are the t-butyl esters of polymethacrylate/polymethacrylic acid block copolymers, which are formed as intermediates and correspond to the following general formula

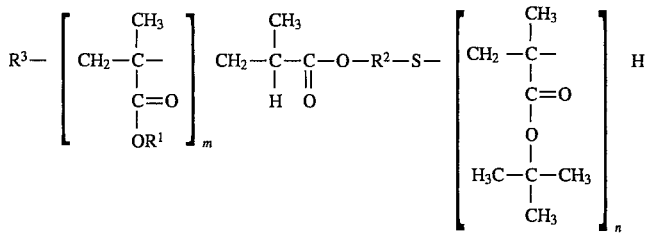

in which the groups and subscripts have the meanings already given. These intermediates are responsible for the structure and properties of the end products.

Examples of these intermediates are

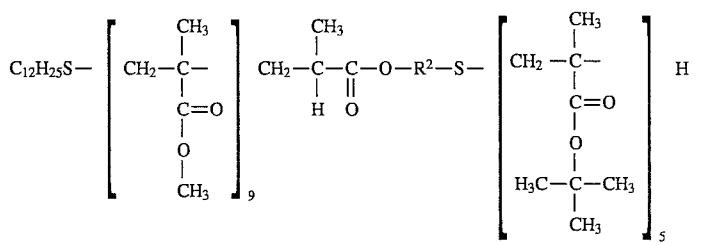

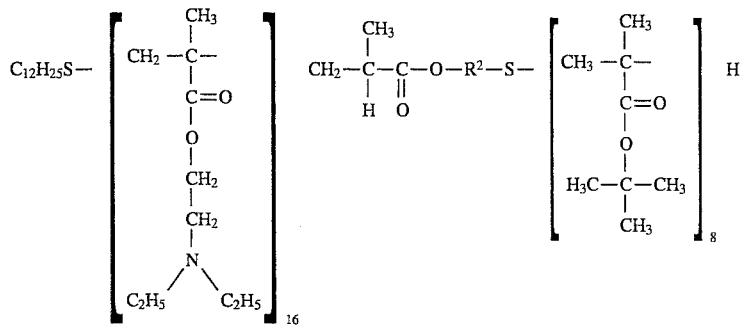

Yet another object of the invention is the synthesis of the inventive block copolymers. This method is characterized in that a) polymers of the general formula

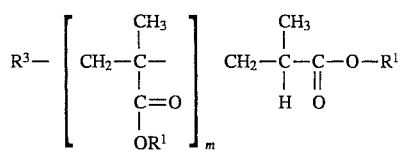

in which the groups and subscripts have the meaning already given, are transesterified with polymers of the general formula

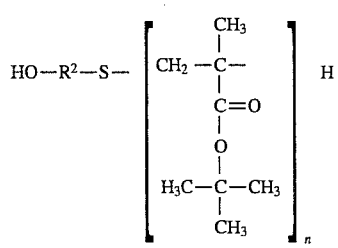

in the molar ratio of 1.1:1 to 1.0:1 with the addition of known catalysts, and b) the polymer thus obtained of the general formula

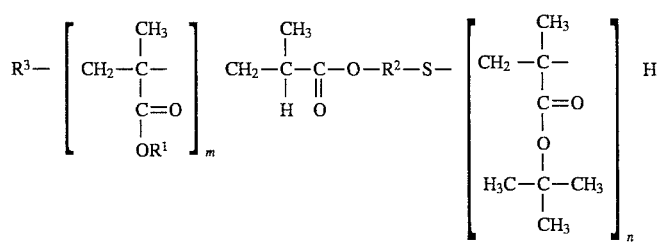

is converted at a temperature above 60° C. in the presence of an acid as a catalyst and optionally of a solvent, or at a temperature above 160° C. without a catalyst by splitting off isobutylene into the desired block copolymer having the formula

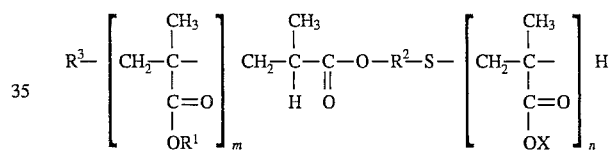

and c) optionally converted in a known manner into the alkali or ammonium salt.

The isobutylene can also be split off photochemically in the presence of so-called Crivello salts (aryl-onium salts), such as triphenylsulfonium hexafluorophosphate, diphenyliodonium hexafluoroantimonate and the like (reference: J. V. Crivello, "*UV Curing: Science and Technology*", S. P. Pappas, ed., Technology Marketing Corp., Stamford, Conn. 1978).

For the transesterification of step a), the molar ratio of 1.05:1 is preferred.

In step a) of the method, there is thus a selective transesterification of a methacrylate ester, obtained by free radical polymerization, with a t-butyl methacrylate, which was obtained by free radical polymerization and for the synthesis of which a hydroxy-functional alkyl mercaptan was used as initiator. This hydroxy group reacts with the terminal ester group of the first-mentioned methacrylate ester polymer. For this reason, the bridging element

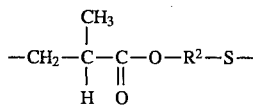

is characteristic for the inventive block copolymer. It was particularly surprising that the terminal ester group at the tertiary carbon atom reacts appreciably more rapidly than the remaining ester groups and particularly also more rapidly than the ester group at the other end of the chain.

Preferably, for the transesterification, a known non-basic transesterification catalyst is used. Examples of such a catalyst are alkyl titanates, such as i-propyl, n-butyl, or i-butyl titanate and stannates, such as dialkyl tin acetate halide or tin dialkyl esters, particularly dibutyl tin dilaurate. The catalysts are used in amounts of 0.5 to 2% by weight, based on the polymethacrylate ester.

In the second step (b) of the method b1) at a temperature in excess of 60° C. in the presence of an acid as a catalyst, particularly of p-toluenesulfonic acid monohydrate, and optionally in the presence of a solvent, such as dioxane, or of solvent mixtures, such as toluene/methanol or toluene/dioxane, or b2) at a temperature above 160° C. without a catalyst, isobutylene is split off and the desired block copolymer is obtained, which can then be converted into the desired alkali or ammonium salt.

In a particularly preferred modification, the acid-catalyzed splitting off of the isobutylene takes place at temperatures of 80° to 100° C. in the presence of a catalyst. If the thermal splitting off is carried out at higher temperatures, anhydric structures are formed, which can be converted once again by known methods into the free acid.

A further object of the invention is the use of the inventive copolymers as polymeric surfactants, particularly as dispersants and emulsifiers and as compounds having antistatic properties.

Preferred areas of application of the inventive polymer are their uses a) as emulsifiers in the aqueous and inverse emulsion polymerization, b) as dispersants or suspension stabilizers for pigments and fillers, such as metal oxides in ceramic materials, pigments in ink jet dyes and fillers in thermoplastic and duroplastic materials, and c) for hydrophilizing and for providing an antistatic finish as polymer dispersant for alloying plastics.

The inventive method and the properties of the inventive block copolymers are described in greater detail in the following examples, it being understood that these examples are provided by way of illustration and not by way of limitation.

EXAMPLE 1A

Synthesis of a Monohydroxy-Functional Poly-t-Butyl Methacrylate by Controlled Free Radical Polymerization (not of the invention)

A solution of 1.47 g of azodiisobutyronitrile and 78.1 g (approximately 1 mole) of 2-mercaptoethanol in 150 g of xylene and 1136.8 g (approximately 8 moles) of t-butyl methacrylate (TBMA) are added over a period of four hours to a reactor filled with 150 g of xylene; the solvent in the reactor has a temperature of 120° C. and is under an atmosphere of nitrogen.

At the end of the reaction, about 400 ppm of hydroquinone monomethyl ether are added and the solution is cooled to about 40° C. The solvent and the residual monomer are then distilled off at 120° C. and 1 torr. A colorless, viscous liquid remains behind.

Gel permeation chromatographic analysis reveals that the polymer obtained has a number average molecular weight $\bar{M}_n$ (GPC) of 1300 and a weight average molecular weight $\bar{M}_w$ (GPC) of 2170. From these, the non-uniformity factor is calculated to be 1.67. By comparing the molecular weight, obtained from the hydroxyl number determination ($\bar{M}_n$/OH number), and the molecular weight, determined from vapor pressure osmometry ($\bar{M}_n$/osmometry), a hydroxy functionality of 1.04 is obtained. The residual monomer content is less than 0.1%.

EXAMPLES 2A TO 8A

Synthesis of Monohydroxy-Functional Poly-t-Butyl Methacrylates of Different Molecular Weights by Controlled, Free-Radical Polymerization (not of the invention)

The method of Example 1A is followed with the exception that the molar ratio of t-butyl methacrylate to 2-mercaptoethanol is varied as shown in Table 1.

TABLE 1

| Example No. | Molar Ratio TBMA/ Regulator | $\bar{M}_n$ OH Number | $\bar{M}_n$ Osmometry | $\bar{M}_n$/GPC (PMMA-Stand.) | Non-uniformity $U = \bar{M}_w/\bar{M}_n$ |
|---|---|---|---|---|---|
| 1A | 8/1 | 1150 | 1200 | 1300 | 1.67 |
| 2A | 7/1 | 950 | 1000 | 1250 | 1.48 |
| 3A | 4/1 | 620 | 700 | 700 | 1.52 |
| 4A | 10/1 | 1350 | 1300 | 1600 | 1.59 |
| 5A | 15/1 | 2050 | 2100 | 2200 | 1.79 |
| 6A | 20/1 | 2600 | 2850 | 2950 | 1.84 |
| 7A | 40/1 | 4900 | 5150 | 5200 | 1.74 |
| 8A | 80/1 | 9900 | — | 11250 | 1.98 |

TBMA: t-butyl methacrylate
Controller: 2-mercaptoethanol
$\bar{M}_n$: number average molecular weight
$\bar{M}_w$: weight average molecular weight

EXAMPLE 1B

Synthesis of a polymethyl Methacrylates by Controlled Free Radical Polymerization (not of the invention)

A solution of 1.4 g of azodiisobutyronitrile, 94 g (approximately 0.47 moles) of dodecyl mercaptan, 76 g of xylene and 376 g (approximately 3.76 moles) of methyl methacrylate is added within a period of 3 to 4 hours to a reactor filled with 40 g of xylene. The solvent in the reactor has a temperature of 100° C. and is under an atmosphere of nitrogen.

Subsequently, a further 0.93 g of azodiisobutyronitrile, dissolved in 9.3 g of methyl ethyl ketone, is added in equal parts over a period of one hour. Finally, the reaction mixture is heated for one hour at a constant temperature of 100° C.

At the end of the reaction, the solvent and the residual monomers are distilled at a temperature of 130° C. and a pressure of 1 torr. A colorless, viscous liquid remains behind.

Gel permeation chromatographic analysis reveals that the polymer obtained has a number average molecular weight $\overline{M}_n$ (GPC) of 1100 and a weight average molecular weight $\overline{M}_w$ (GPC) of 1710. The non-uniformity factor therefore is 1.55. The residual monomer content is less than 0.1%.

EXAMPLES 2B TO 8B

Synthesis of Polymethacrylates with Different Alkyl Groups and Different Molecular Weights by Controlled Free-Radical Polymerization (not of the invention)

The procedure of Example 1B is followed with the exception that different methacrylates are used as monomers and that the ratio of methacrylate to regulator is varied as stated in Table 2. Likewise, number average and weight average molecular weights and the non-uniformity coefficient from gel permeation chromatographic analysis as well as the molecular weight, determined from vapor pressure osmometry, are given in Table 2. In all cases, the residual monomer content found is less than 0.1%.

TABLE 2

| Example No. | Methacrylate | Molar Ratio Methacrylate/ Regulator | $\overline{M}_n$ Osmometry | $\overline{M}_n$/GPC (PMMA-Stand.) | Non-uni formity $U = \overline{M}_w/\overline{M}_n$ |
|---|---|---|---|---|---|
| 1B | MMA | 8/1 | 1150 | 1100 | 1.55 |
| 2B | MMA | 28/1 | 2600 | 2650 | 1.86 |
| 3B | MMA | 46/1 | 5050 | 5200 | 1.78 |
| 4B | MMA | 95/1 | — | 9900 | 1.94 |
| 5B | BMA | 5.6/1 | 950 | 1000 | 1.39 |
| 6B | BMA | 19.7/1 | 3100 | 3650 | 1.78 |
| 7B | EHMA | 4/1 | 950 | 1350 | 1.34 |
| 8B | TFEMA | 7/1 | 1050 | 1150 | 1.49 |

MMA: Methyl methacrylate
BMA: n-Butyl methacrylate
EHMA: 2-Ethylhexyl methacrylate
TFEMA: 2,2,2-Trifluoroethyl methacrylate
Regulator: n-Dodecyl mercaptan

EXAMPLE 1C

Synthesis of a Polymethyl Methacrylate/Poly-t-Butyl Methacrylate Copolymer (of the Invention)

The controlled polymethyl methacrylate (447 g, approximately 0.40 moles), described in Example 1B, and 490.5 g (approximately 0.42 moles) of the monohydroxy-functional poly-t-butyl methacrylate from Example 1A, dissolved in 438 g of toluene, are heated together with 2 mL of triethylamine under pure nitrogen to about 110° C.

Subsequently, the solvent is distilled off at a pressure of 5 torr, any water present being removed at the same time. After the addition of 470 g of toluene, 4.68 g (0.5% by weight) of isopropyl titanate are added at 115° C. The methanol, formed when the reaction sets in, is separated from the toluene by fractionation and removed. After 4 hours, a further 2.34 g (0.25% by weight) of isopropyl titanate are added, the methanol is removed and the reaction is terminated after another 3 hours.

The hydroxyl number of the product obtained is 1.6 and corresponds to a conversion of 96% (based on the component not used in excess). According to gel permeation chromatographic analysis, the number average molecular weight of the block copolymer $\overline{M}_n$ (GPC) is 2,350 and the non-uniformity coefficient is 1.48. The molecular weight, determined from vapor pressure osmometry, is 2050.

EXAMPLES 2C TO 15C

Synthesis of Polymethyl Methacrylate/Poly-t-Butyl Methacrylate Copolymers with Different Alky Groups and Different Molecular Weights In principle, the method of Example 1C is followed, with the exception and as stated in Table 3, that methacrylate segments of different chemical structure and different molecular weights are reacted with monohydroxy-functional poly-t-butyl methacrylates of different molecular weights. Moreover, 1,3-diisopropylbenzene is used instead of toluene as solvent in Examples 9C to 13C. The reaction is carried out at a temperature of 115° C. and a pressure of 40 torr. The total amount of catalysts in Examples 9C to 13C is added in four equal portions. The total reaction time is 16 hours.

TABLE 3

| Example No. | PTBMA of Table 1 Example No. | Polymethacrylate of Table 2 Example No. | Block Copolymer Type* | Conversion OH Number** | $\overline{M}_n$ Osmometry | $\overline{M}_n$/GPC (PMMA-Stand.) | Non-uniformity $U = \overline{M}_w/\overline{M}_n$ |
|---|---|---|---|---|---|---|---|
| 1C | 1A | 1B | MV 1111 | 0.96 | 2050 | 2350 | 1.42 |
| 2C | 3A | 2B | MV 2606 | 0.91 | 3200 | 380 | 1.63 |
| 3C | 2A | 1B | MV 1110 | 0.94 | 2000 | 2250 | 1.42 |
| 4C | 3A | 1B | MV 1106 | 0.87 | 1500 | 1800 | 1.38 |
| 5C | 6A | 1B | MV 1126 | 0.85 | 3350 | 3700 | 1.66 |
| 6C | 7A | 1B | MV 1150 | 0.79 | 5600 | 6200 | 1.89 |
| 7C | 8A | 1B | MV 1199 | 0.75 | — | 12500 | 1.97 |
| 8C | 1A | 2B | MV 2611 | 0.81 | 3100 | 4400 | 1.56 |
| 9C | 3A | 5B | BV 1006 | 0.97 | 1550 | 1900 | 1.31 |
| 10C | 1A | 5B | BV 1011 | 0.92 | 1700 | 2200 | 1.44 |
| 11C | 1A | 6B | BV 2611 | 0.88 | 3800 | 4200 | 1.64 |
| 12C | 3A | 7B | OV 1006 | 0.93 | 1500 | 1850 | 1.42 |
| 13C | 1A | 7B | OV 1011 | 0.97 | 2100 | 2250 | 1.47 |
| 14C | 3A | 8B | FV 1106 | 0.95 | 1500 | 1700 | 1.44 |

TABLE 3-continued

| Example No. | PTBMA of Table 1 Example No. | Polymeth- acrylate of Table 2 Example No. | Block Copolymer Type* | Conver- sion OH Number** | $\bar{M}_n$ Osmometry | $\bar{M}_n$/GPC (PMMA- Stand.) | Non- uniformity $U = \bar{M}_w/\bar{M}_n$ |
|---|---|---|---|---|---|---|---|
| 15C | 1A | 8B | FV 1111 | 0.91 | 2000 | 2300 | 1.52 |

M: Methyl methacrylate
B: n-Butyl methacrylate
O: 2-Ethylhexyl methacrylate
F: 2,2,2-Trifluorethyl methacrylate
V: Intermediate = t-butyl methacrylate
*The first two numbers in column 4, multiplied by 100, correspond approximately to the molecular weight of the methacrylate block; the last two numbers, multiplied by 100, correspond approximately to the molecular weight of the t-butyl methacrylate block. In the case of the MV 1111 product, this means that each of the two segments has a molecular weight of about 1100.
**Moles transesterified, based on the component not used in excess.

EXAMPLE 1D

Synthesis of a Polymethyl Methacrylate/Polymethacrylic Copolymer (of the Invention)

The block copolymer (173 g), described in Example 1C, is heated with 115 g of dioxane and 4.3 g (2.5% by weight) of p-toluenesulfonic acid monohydrate to a temperature of 95° to 100° C. and kept for a period of 5 hours at the same temperature.

The incipient splitting off of the isobutene can be recognized by a distinct evolution of gas. The acid number of the product in the solution obtained is 118 and corresponds to a conversion of 90%.

According to NMR spectroscopy, ($^1$H—, $^{13}$C-NMR: comparison of the signal intensities of the characteristic t-butyl group), the conversion is 97%.

EXAMPLES 2D TO 15D

Synthesis of Polymethacrylate/Polymethacrylic acid Copolymers (of the Invention)

The method of Example 1D is followed with the exception that, when the viscosity becomes too high as the isobutene is being split off, the solids concentration is adjusted by dilution with dioxane, so that homogeneous reaction conditions are ensured throughout the reaction.

No solvents were used for Examples 12D and 13D.

A solvent mixture, consisting of one part dioxane and one part toluene, was used for Examples 8D and 11D.

The conversions, determined from the acid number and $^{13}$C NMR spectroscopy, are given in Table 4.

| Example No. | Block Copolymer of Table 3 Example No. | Block Copolymer Type | Conversion in % (Acid Number)[1] | Conversion in % ($^{13}$C-NMR) |
|---|---|---|---|---|
| 1D | 1C | MA 1111 | 90 | 97 |
| 2D | 2C | MA 2606 | 87 | 98 |
| 3D | 3C | MA 1110 | 96 | 97 |
| 4D | 4C | MA 1106 | 92 | 98 |
| 5D | 5C | MA 1126 | 87 | 97 |
| 6D | 6C | MA 1150 | 90 | 95 |
| 7D | 7C | MA 1199 | 92 | 96 |
| 8D | 8C | MA 2611 | 100 | 98 |
| 9D | 9C | BA 1006 | 89 | 97 |
| 10D | 10C | BA 1011 | 90 | 98 |
| 11D | 11C | BA 2611 | 94 | 96 |
| 12D | 12C | OA 1006 | 95 | 96 |
| 13D | 13C | OA 1011 | 97 | 95 |
| 14D | 14C | FA 1106 | 95 | 99 |
| 15D | 15C | FA 1111 | 94 | 97 |

M: Methyl methacrylate
B: n-Butyl methacrylate
O: 2-Ethylhexyl methacrylate
F: 2,2,2-Trifluoroethyl methacrylate
A: Acid (= Methacrylic acid)
[1]taking into consideration the weighed out amount of p-toluenesulfonic acid monohydrate.

EXAMPLE E

Synthesis of a Polymethyl Methacrylate/Polysodium Methacrylate Copolymer by Neutralization with an Aqueous Sodium Hydroxide Solution (of the invention)

The polymethyl methacrylate/polymethacrylic acid copolymer (2 g), synthesized in Example 1D, is suspended in 31 mL of water, mixed with a few drops of phenolphthalein solution and titrated with 7.7 mL of 1N sodium hydroxide to the end point. A waterwhite solution with a solids content of about 5% is obtained, the pH of which is determined to be 8.7.

What is claimed is:

1. A block copolymer of a formula

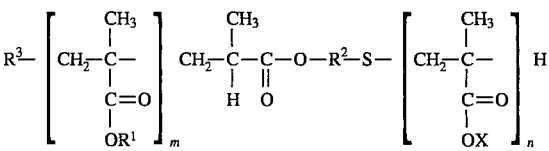

wherein

R$^1$ represents alkyl groups except t-butyl group with 1 to 22 carbon atoms, perfluoroalkyl groups or dialkylaminoalkyl groups, R$^2$ is the —(CH$_2$)$_p$ group, in which p is a number from 2 to 6, R$^3$ represents a chain length regulator which is free of active hydrogen atoms, X is a cation, and n and m are same or different and in each case have an average numerical value of not less than 3.

2. The block copolymer of claim 1, wherein $R^1$ is an alkyl group with 1 to 8 carbon atoms except the t-butyl group, $R^2$ is —$(CH_2)_2$—, $R^3$ is —$C_{12}H_{25}S$—, X is a hydrogen ion, an alkali ion, an ammonium ion or a substituted ammonium ion, and n and m are same or different and in each case have an average numerical value of 4 to 20.

* * * * *